United States Patent Office 3,109,035
Patented Oct. 29, 1963

---

3,109,035
STABILIZED VINYL CHLORIDE MONOMER
Edwin D. Hornbaker, Baton Rouge, La., assignor to Ethyl Corporation, New York, N.Y., a corporation of Virginia
No Drawing. Filed July 29, 1960, Ser. No. 46,073
8 Claims. (Cl. 260—652.5)

This invention relates to the art of stabilizing vinyl chloride, and particularly to vinyl chloride monomer compositions stabilized against prepolymerization.

When vinyl chloride is exposed to the action of air and to various impurities a gradual polymerization occurs with the formation of gummy or resinous products. Polymerization of vinyl chloride is of course desirable in the preparation of plastics but, of course, is never desirable under storage conditions. Consequently, in commerical practice it is generally the practice to inhibit the vinyl chloride monomer by the addition thereto of certain compounds immediately after initial preparation to prevent prepolymerization, i.e., premature polymerization or polymerization of the vinyl chloride before the intended time.

Prepolymerization of the monomer presents an extremely troublesome and expensive problem for not only is the polymerized vinyl chloride completely wasted but in addition the preformed polymer must be removed from the monomer before the monomer can itself be subjected to the desired polymerization conditions. Obviously also, prepolymerization presents acute problems when lines, valves, storage tanks, tank cars and other facilities are suddenly and quite unexpectedly fouled by polymer. One of the most distressing things which can happen is for plant lines and equipment to be "frozen" by polymer. In severe cases drilling and cutting tools must be employed to salvage the equipment. For these reasons then, generally an inhibitor is added to the vinyl chloride monomer immediately after preparation and prior to storage for eventual use.

While the addition of inhibitors to vinyl chloride has been successful, this means of preventing prepolymerization also presents difficulties. Before subjecting the monomer to polymerization, the inhibitor must be removed from the monomer or its effect overcome to prevent interference with polymerization rate and polymeric properties. Thus, generally the inhibitor and vinyl chloride monomer are separated from each other by distillation or by washing out the inhibitor by the use of a solvent immiscible with the monomer. To assure complete removal of the inhibitor, the washing is sometimes followed by distillation.

To eliminate the quite burdensome inhibitor removal steps of commercial practice it is often attempted to avoid adding any inhibitor to the vinyl chloride. This technique is satisfactory if the monomer can be kept out of all contact with air or oxygen containing compounds for the monomer under these conditions will not polymerize. Unfortunately however, it is virtually impossible to maintain these conditions in commercial practice and always some batches of the uninhibited monomer undergo prepolymerization during storage. Hence those avoiding the use of an inhibitor must pay a toll.

Several attempts have been made to overcome the foregoing problems by adding an inhibitor immediately after preparation of the monomer and then trying to overcome the inhibiting effects of the inhibitor with some additive just prior to polymerization. Thus, various and excess quantities of catalysts have been added to polymerization recipes to overcome the effect of the added inhibitor to thereby effect polymerization of the monomer at a reasonable polymerization rate and without removing the inhibitor. Unfortunately such attempts have met with considerable difficulties and usually failure inasmuch as adverse side effects degrade polymer properties.

Despite the foregoing and other adverse effects it is an object of the present invention to advance the state of the art and to provide inhibited vinyl chloride monomer compositions which are adequately stabilized in the presence of light and air and are yet capable of being successfully polymerized under desirable polymerizing conditions without removal of the inhibitor. Specifically, it is an object of this invention to provide specified and specific concentrations of thiazine-vinyl chloride inhibitor compositions which avoid prepolymerization difficulties and which can be polymerized at the desired time without the necessity of having to remove the inhibitor from the monomeric vinyl chloride, said polymerization being accomplished without any substantial decrease in polymerization rate and without degradation of polymer properties. Yet another object of this invention is to provide methods for polymerizing inhibited vinyl chloride monomer without removal of the inhibitor from the polymerization recipes. In addition, it is an object of this invention to provide a new type of stabilizing additive suitable for inhibiting vinyl chloride monomer, and which can be added to the monomer in any desired proportion.

Accordingly these and other objects are accomplished by the present invention which comprises forming stable vinyl chloride monomer compositions by adding to vinyl chloride monomer a quantity of a thiazine compound sufficient to stabilize the monomer against polymerization. In an especially preferred embodiment of the invention stable vinyl chloride monomer compositions are formed by adding to the monomer from about ½ to about 30 parts of a thiazine compound per million parts of vinyl chloride monomer. The compositions formed by the addition of these infinitesimal but critical amounts of thiazine compounds to the vinyl chloride monomer pursuant to the especially preferred embodiment of this invention will not polymerize under ordinary storage conditions but nevertheless can be polymerized in ordinary polymerization processes under desirable polymerization conditions and without adverse effect upon the rate of polymerization or upon polymeric properties. In other words, the additive complement of the vinyl chloride monomer compositions of this invention, unlike all prior practice, need not be removed or otherwise compensated for during the intended polymerization reactions. The thiazine compounds, in amounts greater than about 30 parts per million parts of vinyl chloride monomer, will also effectively stabilize the monomer against prepolymerization but the amount in excess of 30 parts per million parts of vinyl chloride monomer, must be removed or, alternatively, the effect of the thiazine compounds must be overcome prior to normal and desirable polymerization. Thus, thiazine compounds will effectively stabilize vinyl chloride monomer when added thereto in any concentration greater than the minimum already specified. In practice then, the thiazine compounds can be added to the monomer in amounts which would constitute up to about 10 weight percent and higher of the thiazine-vinyl chloride monomer composition so-formed. Generally however, it is unnecessary to form vinyl chloride compositions composed of more than about 1 weight percent thiazine.

The potency of the infinitesimal amount of the additive complement—viz., from about ½ to about 30 parts per million parts of vinyl chloride monomer—of this invention in inhibiting the vinyl chloride monomer against prepolymerization is outstanding. Thus in the standard test procedure ordinary uninhibited monomer will begin to polymerize at least before the end of 48 hours. In sharp contrast, at the end of 1200 hours when the experiments were discontinued, various inhibited compositions of this invention showed no evidence whatever of any prepolymerization. The samples remained perfectly clear. Further, when the inhibited monomer compositions stabilized pursuant to the especially preferred embodiment of this invention were subjected to normal polymerization in accordance with various processes there were no adverse effects upon polymerization rate, polymeric properties or of any ill-effects upon the polymerization processes.

According to one of the especially preferred embodiments of this invention from about ½ to about 30 parts of a thiazine compound is incorporated with each million parts of vinyl chloride monomer, prior to the inception of any substantial prepolymerization thereof. In other words, to vinyl chloride monomer however manufactured—dehydrochlorination of 1,2-dichloroethane, hydrochlorination of acetylene, etc.—is added, generally after the last distillation step, an infinitestimal amount of a thiazine compound. The resultant propolymerization inhibited composition can then be subjected to polymerization at any appropriate time thereafter by incorporation into a polymerization recipe which is subjected to polymerizing conditions.

By providing vinyl chloride monomer with from about ½ to about 30 parts of a thiazine compound per million parts of vinyl chloride monomer, there is formed a composition highly resistant to prepolymerization but yet not resistant to polymerization in ordinary suspension polymerization process. In fact, such compositions are highly suitable for polymerization in all kinds of suspension polymerization systems. Particularly preferred compositions are formed by the use of from about ½ to about 10 parts of a thiazine compound, based on a million parts of vinyl chloride monomer. Such compositions are particularly preferred because not only is prepolymerization very effectively prevented, but the so-inhibited vinyl chloride monomer compositions are generally suitable to all types of polymerization systems. As a matter of fact, in these compositions there is no necessity of changing the conditions of polymerization to any significant extent. Thus, even in a wide number of polymerization processes employing various recipes it is unnecessary to change these proportions to prevent even minor adverse effects upon polymerization rate or upon polymeric properties. In an even more particularly preferred embodiment, a concentration of from about ½ to about 2 parts of a thiazine compound per million parts of vinyl chloride monomer is used in forming the novel compositions of this invention. These compositions are adaptable to any and all types of polymerization systems without any modification of process conditions. Furthermore, despite the fact that in this embodiment the inhibitor concentrations are essentially microscopic, the resistance of the result compositions to prepolymerization is tremendously great. In addition to the concentration variations of the thiazine compounds in vinyl chloride monomer, certain classes of thiazine compounds are also of a more preferred class inasmuch as some offer advantages over other types of thiazine compounds.

Typical thiazines for use in this invention are those characterized by containing in the molecule from one to four rings, from one to two nitrogen atoms, from one to two sulfur atoms, and from four to about thirty-six carbon atoms. Broadly illustrative of such thiazine compounds are such mononuclear compounds as 1,3,2-thiazine, 1,4-thiazine, 1,3-thiazine, 1,2,3-thiadiazine, 1,2,4,6-thiadiazine, and alkyl substituted mononuclear thiazines such as 3-methyl-1,4-thiazine, 2-ethyl-1,4-thiazine and the like. Thiazines containing two rings include ring compounds such as 3-phenyl-1,4-thiazine, 3-benzyl-1,4-thiazine, 2-phenyl-1,4,3-thiadiazine, 1,3-benzothiazine, 3,1,4-benzothiazine, and also including alkyl substituted derivatives thereof such as 2-ethyl-1,4-benzothiazine and the like. Three membered rings include such compounds as 4-naphtho[2.3]-p-thiazine, phenothiazine, 3-isophenothiazine, 4-naphtho[1.2]-p-thiazine, 1-naphtho[2.1]-p-thiazine, 6-dibenzo[c,e]-o-thiazine, naphtho[1.8]-m-thiazine, 4,6-benzobis[1.4]thiazine and the like. Four membered rings include such compounds as 3-benzo[b]-phenothiazine, 5,11-dithia-6,12-diazanaphthacene, 1,1-quinoxalo-[2.3-b]-p-benzothiazine, pyrido[3.2-a]phenazathionium, 1-anthra[2.1]-p-thiazine, and the like.

A preferred embodiment of the invention are those vinyl chloride compositions containing thiazine compounds characterized by containing in the molecule three rings, one nitrogen atom and one sulfur atom, and from twelve to about thirty-six carbon atoms. These compounds are characterized by being readily available at reasonably low cost and are utilizable to provide excellent results. Illustrative of such thiazine compounds are for example, phenothiazine, 3-isophenothiazine, 6-dibenzo[c,e]-o-thiazine, 4-naphtho[2.3]-p-thiazine, 4-naphtho-[1.2]-p-thiazine, 1-naphtho[2.1]-p-thiazine, naphtho-[1.8]-m-thiazine, and derivatives of these compounds such as, for example, 2-ethyl-phenothiazine, 2,3-diisopropyl phenothiazine, 2,3,7,8-tetra-n-amyl phenothiazine, 2,3-di-n-butyl-6-dibenzo[1.2]-p-thiazine and the like. A highly preferred embodiment are those vinyl chloride compositions comprising vinyl chloride monomer inhibited with a phenothiazine type compound, e.g., a compound, substituted or unsubstituted, having the following structural formula:

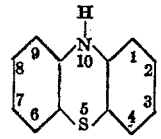

Such a compound, unsubstituted, is thiodiphenyl amine or phenothiazine itself. When substituted, substitution can occur at any one of the positions 1, 2, 3, 4, 6, 7, 8, 9, and 10. Derivatives of phenothiazine are also highly preferred compounds. Thus, compounds formed by the substitution of hydrogen at any one of these positions, yet provide highly preferred compositions when admixed with vinyl chloride monomer. Members which can be substituted at any or all of these positions include alkyl, cycloalkyl, aryl, alkaryl, aralkyl, alkenyl, acyl, halogen, and amine groups. Also, other preferred compounds are those which can be any of the aforementioned groups at the positions indicated, and/or substitution for hydrogen of nitro, cyano and carboalkoxy groups at positions 1, 2, 3, 4, 6, 7, 8 and 9. The sum total number of carbon atoms contained within the molecule of these preferred class of compounds however should not exceed more than about 24 carbon atoms and none of the substituted groups should contain more than about 8 carbon atoms. Illustrative of such compounds are phenothiazine, 2,3-diethyl phenothiazine, 2-butyl-4-octyl phenothiazine, 2-butoxy-4-methoxy phenothiazine, 2-chloro-7,8-di-n-propyl phenothiazine, 2-amino-7,8-dibutoxy phenothiazine, 10-butoxy phenothiazine and the like. These phenothiazines are particularly excellent inhibitors for forming inhibited vinyl chloride monomer compositions, and are outstanding from a cost-effectiveness standpoint since they are available at very low cost as staple articles of commerce. Phenothiazine itself is the most outstanding inhibitor for this invention because of its tremendous effectiveness at minute concentration and its excellent solubility characteristics in the monomer.

The test procedure and the examples following illustrate the ability of novel compositions of this invention to withstand prepolymerization under normal storage and plant operating conditions. In all examples parts and percentages are by weight.

The test procedure used to demonstrate the outstanding resistance of the composition of this invention to prepolymerization involves preparing oxygen-free vinyl chloride monomer by placing freshly distilled monomer within separate glass vessels. The separate vessels are, sequentially, cooled to −78° C., evacuated to remove air, the contents warmed to the boiling point, the vessels cooled and again evacuated, and this procedure repeated through three cycles. Those vinyl chloride portions to be inhibited with thiazine compounds are inhibited just prior to the beginning of the third cycle by the addition thereto of a calculated amount of the particular thiazine. When the temperature of the vinyl chloride monomer is reduced to −78° C. at the beginning of the third cycle, air at a pressure of 650 millimeters is introduced into each of the vessels. Therefore, when equilibrium is reached, each of the vessels contains 3.2 mole percent oxygen in the vapor phase. The vessels are then sealed and maintained at 50° C. while continuously agitating the contents. Periodic observations of the samples are made to determine the advent, if any, of prepolymerization. It was found, as will be shown in the examples below, that the uninhibited monomer in all instances began undesirable prepolymerization in less than 48 hours. Even, at the end of 50 days however, when the experiments were terminated, various inhibited monomer compositions of this invention remained clear and colorless, showing no signs whatever of any prepolymerization. This conclusively shows that the vinyl chloride monomer inhibited in accordance with the present invention is highly resistant to prepolymerization at least under normal storage and plant operating conditions.

*Example I*

An inhibited composition is prepared by adding phenothiazine to vinyl chloride monomer in such proportion so as to form a 0.25 weight percent solution of phenothiazine in vinyl chloride monomer. A charge of this monomer is then added to a glass lined reaction vessel while a charge of uninhibited monomer, of a quantity equal to that of the inhibited charge, is placed in a second identical reactor. Periodic observations show evidence of prepolymerization in the uninhibited monomer in less than 48 hours, while even at the end of an extremely long period of the time there is no evidence whatever of any polymerization of the inhibited monomer.

*Example II*

Vinyl chloride monomer is admixed with 2-propyl phenothiazine in quantity sufficient to form a 1 weight percent solution of 2-propyl phenothiazine in monomer, and then charged into a reaction vessel. Uninhibited vinyl chloride monomer is charged into a second similar reaction vessel until the charges in each of the reaction vessels are similar in quantity. Both of the charges within the vessels are then subjected to identical conditions. Periodic observations of the charges show that the uninhibited monomer has undergone considerable prepolymerization by the end of 40 hours. On the other hand, observations, even at the end of an extremely longer period of time, do not confirm the presence of even a trace of polymer in the inhibited monomer.

*Example III*

To one of two stirred reaction vessels is added uninhibited vinyl chloride monomer, and to the other is added vinyl chloride monomer inhibited with a sufficient quantity of 3-n-propyl phenothiazine to form a 10 weight percent solution of 3-n-propyl phenothiazine in vinyl chloride. Periodic observation of the charges within the two reaction vessels shows that because of polymerization the uninhibited monomer is completely opaque at the end of 40 hours. The inhibited monomer is completely clear, there being no trace of any polymer even at the end of an exceedingly longer period of time.

*Example IV*

Identical glass vessels are filled to the same level, one with uninhibited vinyl chloride monomer and the other with vinyl chloride inhibited with 0.5 part of phenothiazine per million parts of vinyl chloride monomer. The contents of both vessels are subjected to identical polymerization conditions. Polymerization of the uninhibited monomer can be clearly observed at the end of 30 hours and the monomer turns completely milky at the end of 36 hours. However, there is not the faintest evidence of any polymerization of the inhibited monomer even at the end of an extremely long period of time.

*Example V*

In the reaction equipment described, is placed charges consisting of equal quantities of monomer. One of the charges is uninhibited monomer and the other is inhibited with 1 part per million parts of vinyl chloride monomer, of phenothiazine. After subjecting the charges to prepolymerizing conditions, it is found that the charge of uninhibited monomer is milky at the end of 45 hours. The other charge remains clear, showing no evidence of polymerization even after an extremely significant period of time.

*Example VI*

Two charges of vinyl chloride monomer, one uninhibited and the other inhibited with 30 parts of phenothiazine per million parts of vinyl chloride monomer, are subjected to identical conditions within the reaction equipment described. It is found that the uninhibited monomer undergoes considerable polymerization even at the end of only 48 hours. On the other hand, even at the end of a considerably longer period, there is no evidence whatsoever of any polymerization within the inhibited monomer.

*Example VII*

Identical glass vessels are filled to the same level, one with uninhibited vinyl chloride monomer and the other with vinyl chloride inhibited with 1 part of 10-ethyl phenothiazine per million parts of vinyl chloride monomer. The contents of both vessels are subjected to identical polymerization conditions. Polymerization of the uninhibited monomer can be clearly observed at the end of 30 hours and the monomer turns completely milky at the end of 36 hours. However, there is not the faintest evidence of any polymerization of the inhibited monomer even at the end of an extremely long period of time.

*Example VIII*

Vinyl chloride monomer is admixed with 2 parts of 2, 3-diphenyl phenothiazine per million parts of vinyl chloride monomer, and charged into a reaction vessel. Uninhibited vinyl chloride monomer is charged into a second similar reaction vessel until the charges in each of the reaction vessels are similar in quantity. Both of the charges within the vessels are then subjected to identical conditions. Periodic observation of the charges show that the uninhibited monomer has undergone considerable prepolymerization by the end of 40 hours. On the other hand, observations, even at the end of an extremely longer period of time, do not confirm the presence of even a trace of polymer in the inhibited monomer.

*Example IX*

An inhibited composition is prepared by adding 2-nitro-10-benzoyl phenothiazine to vinyl chloride monomer in the proportions of 0.5 part per million parts of vinyl chloride monomer. A charge of this monomer is then added to a glass lined reaction vessel while a charge of uninhibited monomer, of a quantity equal to that of the inhibited charge, is placed in a second identical reactor. Periodic observations show evidence of prepolymerization in the uninhibited monomer in less than 48 hours, while even at the end of an extremely long period of time there is no evidence whatever of any polymerization of the inhibited monomer.

Example X

To one of two stirred reaction vessels is added uninhibited vinyl chloride monomer, and to the other is added vinyl chloride monomer inhibited with 5 parts per million parts of vinyl chloride monomer of 1-chloro-4-butoxy phenothiazine. Periodic observation of the charges within the two reaction vessels shows that because of polymerization the uninhibited monomer is completely opaque at the end of 40 hours. The inhibited monomer is completely clear, there being no trace of any polymer even at the end of an exceedingly longer period of time.

Example XI

Two charges of vinyl chloride monomer, one uninhibited and the other inhibited with 2 parts of 2-acetyl-4-ethyl phenothiazine per million parts of vinyl chloride monomer, are subjected to identical conditions within the reaction equipment described. It is found that the uninhibited monomer undergoes considerable polymerization even at the end of only 48 hours. On the other hand, even at the end of a considerably longer period, there is no evidence whatsoever of any polymerization within the inhibited monomer.

Example XII

Identical glass vessels are filled to the same level, one with uninhibited vinyl chloride monomer and the other with vinyl chloride inhibited with 30 parts of 2-cyano-3-isooctyl-1-8-bromophenothiazine per million parts of vinyl chloride monomer. The contents of both vessels are subjected to identical polymerization conditions. Polymerization of the uninhibited monomer can be clearly observed at the end of 30 hours and the monomer turns completely milky at the end of 36 hours. However, there is not the faintest evidence of any polymerization of the inhibited monomer even at the end of an extremely long period of time.

Example XIII

Vinyl chloride monomer is admixed with 20 parts of 2,3-dicarboxy phenothiazine per million parts of vinyl chloride monomer and charged into a reaction vessel. Uninhibited vinyl chloride monomer is charged into a second similar reaction vessel until the charges in each of the reaction vessels are similar in quantity. Both of the charges within the vessels are then subjected to identical conditions. Periodic observation of the charges show that the uninhibited monomer has undergone considerable prepolymerization by the end of 40 hours. On the other hand, observations, even at the end of an extremely longer period of time, do not confirm the presence of even a trace of polymer in the inhibited monomer.

Example XIV

To one of two stirred reaction vessels is added uninhibited vinyl chloride monomer, and to the other is added vinyl chloride monomer inhibited with 2 parts per million parts of vinyl chloride monomer of phenothiazine. Periodic observation of the charges within the two reaction vessels shows that because of polymerization the uninhibited monomer is completely opaque at the end of 40 hours. The inhibited monomer is completely clear, there being no trace of any polymer even at the end of an exceedingly longer period of time.

Example XV

An inhibited composition is prepared by adding 2-acetyl phenothiazine to vinyl chloride monomer in the proportions of 1.5 parts per million parts of vinyl chloride monomer. A charge of this monomer is then added to a glass lined reaction vessel while a charge of uninhibited monomer, of a quantity equal to that of the inhibited charge, is placed in a second identical reactor. Periodic observations show evidence of prepolymerization in the uninhibited monomer in less than 48 hours, while even at the end of an extremely long period of time there is no evidence whatsoever of any polymerization of the inhibited monomer.

Example XVI

Two charges of vinyl chloride monomer, one uninhibited and the other inhibited with 1 part of 10-chlorophenothiazine per million parts of vinyl chloride monomer, are subjected to identical conditions within the reaction equipment described. It is found that the uninhibited monomer undergoes considerable polymerization even at the end of only 48 hours. On the other hand, even at the end of a considerably longer period, there is no evidence whatsoever of any polymerization within the inhibited monomer.

Example XVII

An inhibited composition is prepared by adding 6-dibenzo-[c,e]-o-thiazine to vinyl chloride monomer in the proportions of 2 parts per million parts of vinyl chloride monomer. A charge of this monomer is then added to a glass lined reaction vessel while a charge of uninhibited monomer, of a quantity equal to that of the inhibited charge, is placed in a second identical reactor. Periodic observations show evidence of prepolymerization in the uninhibited monomer in less than 48 hours, while even at the end of an extremely long period of time there is no evidence whatsoever of any polymerization of the inhibited monomer.

Example XVIII

Identical glass vessels are filled to the same level, one with uninhibited vinyl chloride monomer and the other with vinyl chloride inhibited with 1 part of 4-naphtho[2.3]-p-thiazine per million parts of vinyl chloride monomer. The contents of both vessels are subjected to identical polymerization conditions. Polymerization of the uninhibited monomer can be clearly observed at the end of 30 hours and the monomer turns completely milky at the end of 36 hours. However, there is not the faintest evidence of any polymerization of the inhibited monomer even at the end of an extremely long period of time.

Example XIX

To one of two stirred reaction vessels is added uninhibited vinyl chloride monomer, and to the other is added vinyl chloride monomer inhibited with 2 parts per million parts of vinyl chloride monomer of 9-octyl-10-butyl-4-naphtho[2.3]-p-thiazine. Periodic observation of the charges within the two reaction vessels shows that because of polymerization the uninhibited monomer is completely opaque at the end of 40 hours. The inhibited monomer is completely clear, there being no trace of any polymer even at the end of an exceedingly longer period of time.

Example XX

Vinyl chloride monomer is admixed with 10 parts of 9-amyloxy-10-carboxy-4-naphtho[2.3]-p-thiazine per million parts of vinyl chloride monomer, and charged into a reaction vessel. Uninhibited vinyl chloride monomer is charged into a second similar reaction vessel until the charges in each of the reaction vessels are similar in quantity. Both of the charges within the vessels are then subjected to identical conditions. Periodic observation of the charges show that the uninhibited monomer has undergone considerable prepolymerization by the end of 40 hours. On the other hand, observations, even at the end of an extremely longer period of time, do not confirm the presence of even a trace of polymer in the inhibited monomer.

Example XXI

In the reaction equipment described is placed charges consisting of equal quantities of monomer. One of the charges is uninhibited monomer and the other is inhibited with 20 parts per million parts of vinyl chloride monomer of 2-butyl-5-chloro-4-naphtho[2.3]-p-thiazine. After subjecting the charges to prepolymerizing conditions it is found that the charge of uninhibited monomer is milky at the end of 45 hours. The other charge remains clear, showing no evidence of polymerization even after an extremely significant period of time.

*Example XXII*

Two charges of vinyl chloride monomer, one uninhibited and the other inhibited with 5 parts of 4-acetyl-7-carbobutoxy-4-naphtho[2.3]-p-thiazine per million parts of vinyl chloride monomer, are subjected to identical conditions within the reaction equipment described. It is found that the uninhibited monomer undergoes considerable polymerization even at the end of only 48 hours. On the other hand, even at the end of a considerably longer period, there is no evidence whatsoever of any polymerization within the inhibited monomer.

*Example XXIII*

Vinyl chloride monomer is admixed with 20 parts of 9-nitro-10-amino-4-naphtho[2.3]-p-thiazine per million parts of vinyl chloride monomer and charged into a reaction vessel. Uninhibited vinyl chloride monomer is charged into a second similar reaction vessel until the charges in each of the reaction vessels are similar in quantity. Both of the charges within the vessels are then subjected to identical conditions. Periodic observation of the charges show that the uninhibited monomer has undergone considerable prepolymerization by the end of 40 hours. On the other hand, observations, even at the end of an extremely longer period of time, do not confirm the presence of even a trace of polymer in the inhibited monomer.

*Example XXIV*

In the reaction equipment described is placed charges consisting of equal quantities of monomer. One of the charges is uninhibited monomer and the other is inhibited with 10 parts, per million parts of vinyl chloride monomer, of 8-ethylamino-10-ethyl-4-naphtho[2.3]-p-thiazine. After subjecting the charges to prepolymerizing conditions it is found that the charge of uninhibited monomer is milky at the end of 45 hours. The other charge remains clear, showing no evidence of polymerization even after an extremely significant period of time.

*Example XXV*

An inhibited composition is prepared by adding 1-naphtho[2.3]-p-thiazine to vinyl chloride monomer in the proportions of 7 parts per million parts of vinyl chloride monomer. A charge of this monomer is then added to a glass lined reaction vessel while a charge of uninhibited monomer, of a quantity equal to that of the inhibited charge, is placed in a second identical reactor. Periodic observations show evidence of prepolymerization in the uninhibited monomer in less than 48 hours, while even at the end of an extremely long period of time there is no evidence whatsoever of any polymerization of the inhibited monomer.

*Example XXVI*

Two charges of vinyl chloride monomer, one uninhibited and the other inhibited with 12 parts of naphtho[1.8]-m-thiazine per million parts of vinyl chloride monomer, are subjected to identical conditions within the reaction equipment described. It is found that the uninhibited monomer undergoes considerable polymerization even at the end of only 48 hours. On the other hand, even at the end of a considerably longer period, there is no evidence whatsoever of any polymerization within the inhibited monomer.

*Example XXVII*

Identical glass vessels are filled to the same level, one with uninhibited vinyl chloride monomer and the other with vinyl chloride inhibited with 5 parts of 2-butyl-5-ethoxy-naphtho[1.8]-m-thiazine per million parts of vinyl chloride monomer. The contents of both vessels are subjected to identical polymerization conditions. Polymerization of the uninhibited monomer can be clearly observed at the end of 30 hours and the monomer turns completely milkly at the end of 36 hours. However, there is not the faintest evidence of any polymerization of the inhibited monomer even at the end of an extremely long period of time.

*Example XXVIII*

To one of the two stirred reaction vessels is added uninhibited vinyl chloride monomer, and to the other is added vinyl chloride monomer inhibited with 25 parts per million parts of vinyl chloride monomer of 4,5-diphenylnaphtho[1.8]-m-thiazine. Periodic observation of the charges within the two reaction vessels shows that because of polymerization the uninhibited monomer is completely opaque at the end of 40 hours. The inhibited monomer is completely clear, there being no trace of any polymer even at the end of an exceedingly longer period of time.

*Example XXIX*

An inhibited composition is prepared by adding 3-benzo[b]phenothiazine to vinyl chloride monomer in the proportions of 7 parts per million parts of vinyl chloride monomer. A charge of this monomer is then added to a glass lined reaction vessel while a charge of uninhibited monomer, of a quantity equal to that of the inhibited charge, is placed in a second identical reactor. Periodic observations show evidence of prepolymerization in the uninhibited monomer in less than 48 hours, while even at the end of an extremely long period of time there is no evidence whatsoever of any polymerization of the inhibited monomer.

*Example XXX*

Vinyl chloride monomer is admixed with 12 parts of 12-benzo[b]phenothiazine per million parts of vinyl chloride monomer and charged into a reaction vessel. Uninhibited vinyl chloride monomer is charged into a second similar reaction vessel until the charges in each of the reaction vessels are similar in quantity. Both of the charges within the vessels are then subjected to identical conditions. Periodic observation of the charges show that the uninhibited monomer has undergone considerable prepolymerization by the end of 40 hours. On the other hand, observations, even at the end of an extremely longer period of time, do not confirm the presence of even a trace of polymer in the inhibited monomer.

*Example XXXI*

In the reaction equipment described, is placed charges consisting of equal quantities of monomer. One of the charges is uninhibited monomer and the other is inhibited with 1 part per million parts of vinyl chloride monomer, of 1-anthra[2.1]-p-thiazine After subjecting the charges to prepolymerizing conditions it is found that the charge of uninhibited monomer is milky at the end of 45 hours. The other charge remains clear, showing no evidence of polymerization even after an extremely significant period of time.

*Example XXXII*

Identical glass vessels are filled to the same level, one with uninhibited vinyl chloride monomer and the other with vinyl chloride inhibited with 10 parts of bisbenzothiazine per million parts of vinyl chloride monomer. The contents of both vessels are subjected to identical polymerization conditions. Polymerization of the uninhibited monomer can be clearly observed at the end of 30 hours and the monomer turns completely milky at the end of 36 hours. However, there is not the faintest evidence of any polymerization of the inhibited monomer even at the end of an extremely long period of time.

Example XXXIII

Two charges of vinyl chloride monomer, one uninhibited and the other inhibited with 2 parts of diphenazinethiazine per million parts of vinyl chloride monomer, are subjected to identical conditions within the reaction equipment described. It is found that the uninhibited monomer undergoes considerable polymerization even at the end of only 48 hours. On the other hand, even at the end of a considerably longer period, there is no evidence whatsoever of any polymerization within the inhibited monomer.

Example XXXIV

To one of two stirred reaction vessels is added uninhibited vinyl chloride monomer, and to the other is added vinyl chloride monomer inhibited with 15 parts per million parts of vinyl chloride monomer of 8-octadecyl-6-naphtho[2.3-c][1.2]benzothiazine. Periodic observation of the charges within the two reaction vessels shows that because of polymerization the uninhibited monomer is completely opaque at the end of 40 hours. The inhibited monomer is completely clear, there being no trace of any polymer even at the end of an exceedingly longer period of time.

Example XXXV

Vinyl chloride monomer is admixed with 7 parts of 7-dodecyl-10-nonyl-12-chloro-6-naphtho[2.3-c][1.2]benzothiazine per million parts of vinyl chloride monomer and charged into a reaction vessel. Uninhibited vinyl chloride monomer is charged into a second similar reaction vessel until the charges in each of the reaction vessels are similar in quantity. Both of the charges within the vessels are then subjected to identical conditions. Periodic observation of the charges show that the uninhibited monomer has undergone considerable prepolymerization by the end of 40 hours. On the other hand, observations, even at the end of an extremely longer period of time, do not confirm the presence of even a trace of polymer in the inhibited monomer.

Example XXXVI

An inhibited composition is prepared by adding 10-benzo-[c]phenothiazine to vinyl chloride monomer in the proportions of 30 parts per million parts of vinyl chloride monomer. A charge of this monomer is then added to a glass lined reaction vessel while a charge of uninhibited monomer, of a quantity equal to that of the inhibited charge, is placed in a second identical reactor. Periodic observations show evidence of prepolymerization in the uninhibited monomer in less than 48 hours, while even at the end of an extremely long period of time there is no evidence whatsoever of any polymerization of the inhibited monomer.

Example XXXVII

Identical glass vessels are filled to the same level, one with uninhibited vinyl chloride monomer and the other with vinyl chloride inhibited with 10 parts of 10-butoxy-12-ethyl-12-benzo[b]-phenothiazine per million parts of vinyl chloride monomer. The contents of both vessels are subjected to identical polymerization conditions. Polymerization of the uninhibited monomer can be clearly observed at the end of 30 hours and the monomer turns completely milky at the end of 36 hours. However, there is not the faintest evidence of any polymerization of the inhibited monomer even at the end of an extremely long period of time.

Example XXXVIII

In the reaction equipment described, is placed charges consisting of equal quantities of monomer. One of the charges is uninhibited monomer and the other is inhibited with 2 parts per million parts of vinyl chloride monomer of 2-cyano-11-allyl-12-benzo[b]phenothiazine. After subjecting the charges to prepolymerizing conditions it is found that the charge of uninhibited monomer is milky at the end of 45 hours. The other charge remains clear, showing no evidence of polymerization even after an extremely significant period of time.

Example XXXIX

Two charges of vinyl chloride monomer, one uninhibited and the other inhibited with 5 parts of 2,3-dichloro-10-hexyl-12-benzo[b]phenothiazine per million parts of vinyl chloride monomer, are subjected to identical conditions within the reaction equipment described. It is found that the uninhibited monomer undergoes considerable polymerization even at the end of only 48 hours. On the other hand, even at the end of a considerably longer period, there is no evidence whatsoever of any polymerization within the inhibited monomer.

Example XL

To one of two stirred reaction vessels is added uninhibited vinyl chloride monomer, and to the other is added vinyl chloride monomer inhibited with 5 parts per million parts of vinyl chloride monomer of 3-benzyl-12-benzo[b]phenothiazine. Periodic observation of the charges within the two reaction vessels shows that because of polymerization the uninhibited monomer is completely opaque at the end of 40 hours. The inhibited monomer is completely clear, there being no trace of any polymer even at the end of an exceedingly longer period of time.

Example XLI

In the reaction equipment described, is placed charges consisting of equal quantities of monomer. One of the charges is uninhibited monomer and the other is inhibited with 1 part per million parts of vinyl chloride monomer of 1,4-thiazine. After subjecting the charges to prepolymerizing conditions it is found that the charge of uninhibited monomer is milky at the end of 45 hours. The other charge remains clear, showing no evidence of polymerization even after an extremely significant period of time.

Example XLII

Identical glass vessels are filled to the same level, one with uninhibited vinyl chloride monomer and the other with vinyl chloride inhibited with 10 parts of 1,3,2-thiazine per million parts of vinyl chloride monomer. The contents of both vessels are subjected to identical polymerization conditions. Polymerization of the uninhibited monomer can be clearly observed at the end of 30 hours and the monomer turns completely milky at the end of 36 hours. However, there is not the faintest evidence of any polymerization of the inhibited monomer even at the end of an extremely long period of time.

Example XLIII

Vinyl chloride monomer is admixed with 12 parts of 2-butyl-1,4-thiazine per million parts of vinyl chloride monomer and charged into a reaction vessel. Uninhibited vinyl chloride monomer is charged into a second similar vessel until the charges in each of the reaction vessels are similar in quantity. Both of the charges within the vessels are then subjected to identical conditions. Periodic observation of the charges show that the uninhibited monomer has undergone considerable prepolymerization by the end of 40 hours. On the other hand, observations, even at the end of an extremely longer period of time, do not confirm the presence of even a trace of polymer in the inhibited monomer.

Example XLIV

Two charges of vinyl chloride monomer, one uninhibited and the other inhibited with 1 part of 2,6-dibutyl-1,4-thiazine per million parts of vinyl chloride monomer, are subjected to identical conditions within the reaction equipment described. It is found that the uninhibited monomer undergoes considerable polymerization even at the end of only 48 hours. On the other hand, even at the end of a considerably longer period, there is no evidence whatsoever of any polymerization within the inhibited monomer.

*Example XLV*

An inhibited composition is prepared by adding 2-phenyl-1,4-thiazine to vinyl chloride monomer in the proportions of 5 parts per million parts of vinyl chloride monomer. A charge of this monomer is then added to a glass lined reaction vessel while a charge of uninhibited monomer, of a quantity equal to that of the inhibited charge, is placed in a second identical reactor. Periodic observations show evidence of prepolymerization in the uninhibited monomer in less than 48 hours, while even at the end of an extremely long period of time there is no evidence whatsoever of any polymerization of the inhibited monomer.

*Example XLVI*

Two charges of vinyl chloride monomer, one uninhibited and the other inhibited with 30 parts of 1,3-benzothiazine per million parts of vinyl chloride monomer, are subjected to identical conditions within the reaction equipment described. It is found that the uninhibited monomer undergoes considerable polymerization even at the end of only 48 hours. On the other hand, even at the end of a considerably longer period, there is no evidence whatsoever of any polymerization within the inhibited monomer.

*Example XLVII*

Vinyl chloride monomer is admixed with 12 parts of 7-butoxy-1,2-benzothiazine per million parts of vinyl chloride monomer and charged into a reaction vessel. Uninhibited vinyl chloride monomer is charged into a second similar reaction vessel until the charges in each of the reaction vessels are similar in quantity. Both of the charges within the vessels are then subjected to identical conditions. Periodic observation of the charges show that the uinhibited monomer has undergone considerable prepolymerization by the end of 40 hours. On the other hand, observations, even at the end of an extremely longer period of time, do not confirm the presence of even a trace of polymer in the inhibited monomer.

*Example XLVIII*

Identical glass vessels are filled to the same level, one with uninhibited vinyl chloride monomer and the other with vinyl chloride inhibited with 20 parts of 6-chloro-1,2-benzothiazine per million parts of vinyl chloride monomer. The contents of both vessels are subjected to identical polymerization conditions. Polymerization of the uninhibited monomer can be clearly observed at the end of 30 hours and the monomer turns completely milky at the end of 36 hours. However, there is not the faintest evidence of any polymerization of the inhibited monomer even at the end of an extremely long period of time.

*Example XLIX*

To one of two stirred reaction vessels is added uninhibited vinyl chloride monomer, and to the other is added vinyl chloride monomer inhibited with 2 parts per million parts of vinyl chloride monomer of 5-cyano-1,2-benzothiazine. Periodic observation of the charges within the two reaction vessels shows that because of polymerization the uninhibited monomer is completely opaque at the end of 40 hours. The inhibited monomer is completely clear, there being no trace of any polymer even at the end of an exceedingly longer period of time.

*Example L*

In the reaction equipment described, is placed charges consisting of equal quantities of monomer. One of the charges is uninhibited monomer and the other is inhibited with 5 parts per million parts of vinyl chloride monomer of 1,5-heptabenzothiazine. After subjecting the charges to prepolymerizing conditions it is found that the charge of uninhibited monomer is milky at the end of 45 hours. The other charge remains clear, showing no evidence of polymerization even after an extremely significant period of time.

*Example LI*

Two charges of vinyl chloride monomer, one uninhibited and the other inhibited with 10 parts of 6,7-benzo-1,3,4-octathiodiazine per million parts of vinyl chloride monomer, are subjected to identical conditions within the reaction equipment described. It is found that the uninhibited monomer undergoes considerable polymerization even at the end of only 48 hours. On the other hand, even at the end of a considerably longer period, there is no evidence whatsoever of any polymerization within the inhibited monomer.

To further illustrate the tremendous advantages derived pursuant to the present invention, the following examples are exemplary.

*Example LII*

After 1200 hours the inhibited monomer stabilized pursuant to Example V, showing no signs of prepolymerization whatsoever, was blended without removal of the phenothiazine inhibitor into a suspension type polymerization recipe and subjected to polymerizing conditions. The monomer was thus changed into polyvinyl chloride. The polyvinyl chloride process itself was normal in every way. There was no increase whatever in the time required for the polymerization cycle. Moreover, the polymer produced in the process was also normal in every way, as contrasted with a similar polymerization of uninhibited monomer, except that an improvement was found in the gel count. Improvement of this property in itself is extremely significant.

*Example LIII*

When the foregoing example was repeated except that the inhibited monomer was subjected to polymerization in an emulsion recipe, the results were equally impressive. The polymerization process and properties of the polymer were unaltered in any way except that the gel count was considerably improved.

The utility of the compounds of the present invention is not generally impaired by the co-presence of other additives added to the vinyl chloride monomer in small amount. In addition, mixtures of thiazine compounds can be employed in accordance with the present invention. The quantities of the thiazine compounds added to the vinyl chloride monomer are not critical for stabilization purposes per se, but if greater than about 30 parts per million parts of vinyl chloride monomer is used, the excess must generally be removed prior to normal polymerization.

It is apparent from the disclosure also that an extremely wide variety of thiazine compounds are utilizable pursuant to the present invention.

Nonlimiting examples of three-ring thiazine compounds are phenothiazine, 2-isophenothiazine, 2-methyl-phenothiazine, 3 - octyl-phenothiazine, 2,3 - dihexyl-phenothiazine, 2 - butoxy - phenothiazine, 2,8 - dibutoxy-phenothiazine, 4-hexyl-phenothiazine, 4-octyl-phenothiazine, 10-isooctyl-phenothiazine, 2-cyano-phenothiazine, 2-chloro-phenothiazine, 4 - nitro-phenothiazine, 4-amino-phenothiazine, 2 - carboxamide-phenothiazine, 5-acetyl-phenothiazine, 5-amino-phenothiazine, 5-chloro-phenothiazine, and 5-isobutoxy-phenothiazine; including also such three-ring naphtho type compounds as 2-phenyl-6-dibenzo[c,e]-o-thiazine, 2,3-dibutyl-6-dibenzo[c,e]-o-thiazine, 2,3-dibutoxy-6-dibenzo[c,e]-o-thiazine, 5-amyloxy-6-dibenzo[c,e]-o-thiazine, 5-chloro-6-dibenzo[c,e]-o-thiazine, 5-octyl - 4 - naphtho[1.2]-p-thiazine, 5,6-dioctyl-4-naphtho[1.2]-p-thiazine, 7 - hexyl - 4-naphtho[1.2]-p-thiazine, 8-heptyl - 4 - naphtho[1.2] - p-thiazine, 5-heptyl-1-naphtho-

[2.1]-p-thiazine, 5,6 - diheptyl-1-naphtho[2.1]-p-thiazine, 4,5-dimethyl-naphtho[1.8]-m-thiazine, 5,6-diheptyl-naphtho[1.8] - m - thiazine, 4 - cyano-6-octyl-naphtho[1.8]-m-thiazine, and the like.

Illustrative of four-ring thiazine compounds suitable for the practice of this invention are such compounds as 4-phenyl phenothiazine, 4-benzyl phenothiazine, 10-benzyl phenothiazine, 7 - phenyl - 4 - naphtho[1.2]-p-thiazine, 8-benzyl - 4 - naphtho[1.2]-p-thiazine, 5,6-diphenyl-1-naphtho[2.1]-p-thiazine, 4-phenyl-naphtho[1.8]-m-thiazine, 3-benzo[b]phenothiazine, 2,6-dioctyl-3-benzo[b]-phenothiazine, 2-chloro-8-octyl-3-benzo[b]phenothiazine, 7,8-dibromo-3-benzo[b]phenothiazine, 12-nonyl-1-anthra[2.1]-p-thiazine, 8,9-decyl-1-anthra[2.1]-p-thiazine, 7-bromo-1-anthra[2.1] - p - thiazine, 8 - butoxy-1-anthra[2.1]-p-thiazine, 8,9-dibutoxy-1-anthra[2.1]-p-thiazine and the like.

One- and two-membered ring thiazine compounds include such componnds as 1,3-thiazine, 1,4-thiazine, 2-octyl - 1,4 - thiazine, 2 - phenyl-1,4-thiazine, 1,2-benzothiazine, 3,4 - dioctyl-1,2-benzothiazine, 4-octyl-5-butyl-1,2-benzothiazine, 6,7-dioctyl-3,1,4-benzothiazine, 8-chloro-3,1,4-benzothiazine, 2-methyl-3,1,4-benzothiazine, 5,6-diethyl-1,4,2-benzothiazine, 6-nonyl-1,4,2-benzothiazine, 8-decyl - 1,4,2 - benzothiazine, 7,8-didodecyl-1,4,2-benzothiazine, 7,8-didodecyl-1,4-benzothiazine and the like.

As many apparently widely different embodiments of this invention may be made without departing from the spirit and scope thereof, it is understood that the invention should not be limited to the specific embodiments thereof.

Having described the invention what is claimed is:

1. A stable monomer composition which comprises vinyl chloride and thiazine compound characterized by containing in the molecule from one to four rings, from one to two nitrogen atoms, from one to two sulfur atoms, and from 4 to about 36 carbon atoms, said thiazine compound being present in the vinyl chloride in concentration of up to about 10 weight percent to inhibit the vinyl chloride monomer against prepolymerization.

2. The composition of claim 1 wherein said thiazine compound is characterized by containing in the molecule three rings, one nitrogen atom, one sulfur atom and from 12 to about 36 carbon atoms.

3. The composition of claim 1 wherein said thiazine compound is phenothiazine compound characterized by containing in the molecule from 12 to about 24 carbon atoms.

4. The composition of claim 1 wherein said thiazine compound is phenothiazine.

5. A stable monomer composition which comprises vinyl chloride and thiazine compound characterized by containing in the molecule from one to four rings, from one to two nitrogen atoms, from one to two sulfur atoms, and from 4 to about 36 carbon atoms in an amount, ranging from about one-half to about 30 parts per million, to inhibit the vinyl chloride against prepolymerization.

6. The composition of claim 5 wherein the thiazine compound is present in the vinyl chloride at an amount of from about ½ to about 10 parts per million.

7. The composition of claim 5 wherein the thiazine compound is present in the vinyl chloride at an amount of from about ½ to about 2 parts per million.

8. The composition of claim 5 wherein the thiazine compound is phenothiazine.

References Cited in the file of this patent

UNITED STATES PATENTS

| | | |
|---|---|---|
| 2,136,334 | Coleman et al. | Nov. 8, 1938 |
| 2,868,764 | Hirsty | Jan. 13, 1959 |
| 3,015,677 | Vogt et al. | Jan. 2, 1962 |